(12) United States Patent
Abe et al.

(10) Patent No.: US 6,674,893 B1
(45) Date of Patent: Jan. 6, 2004

(54) THREE-DIMENSIONAL SHAPE MEASURING APPARATUS

(75) Inventors: Tsutomu Abe, Nakai-machi (JP); Yutaka Egawa, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 574 days.

(21) Appl. No.: 09/655,915

(22) Filed: Sep. 6, 2000

(30) Foreign Application Priority Data

Oct. 19, 1999 (JP) .......................................... 11-297443

(51) Int. Cl.[7] ................................................ G06K 9/00
(52) U.S. Cl. ......................... 382/154; 382/106; 356/610
(58) Field of Search ................................ 382/106, 108, 382/154; 348/136, 139, 143, 144; 356/603–610, 3, 3.01, 3.09, 3.1, 12

(56) References Cited

U.S. PATENT DOCUMENTS

| | | | |
|---|---|---|---|
| 4,511,252 A | * | 4/1985 | Di Matteo et al. ........... 356/610 |
| 4,687,326 A | * | 8/1987 | Corby, Jr. ................... 356/5.01 |
| 4,794,262 A | * | 12/1988 | Sato et al. .............. 250/559.22 |
| 5,102,223 A | * | 4/1992 | Uesugi et al. ............... 356/607 |
| 5,831,719 A | * | 11/1998 | Berg et al. .................. 356/5.13 |
| 5,848,188 A | * | 12/1998 | Shibata et al. ............... 382/203 |
| 6,057,909 A | * | 5/2000 | Yahav et al. ................ 356/5.04 |
| 6,356,298 B1 | * | 3/2002 | Abe et al. ..................... 348/47 |

FOREIGN PATENT DOCUMENTS

| | | |
|---|---|---|
| JP | A 5-332737 | 12/1993 |
| JP | B2 2565885 | 10/1996 |

OTHER PUBLICATIONS

Egawa et al., "A Proposal of Range Finder by Space Re–encoding Method", proceedings of 3–D Image Conference, 1999, Fuji Xerox Co., Ltd. Corporate Research Lab.

* cited by examiner

Primary Examiner—Amelia M. Au
Assistant Examiner—Virginia Kibler
(74) Attorney, Agent, or Firm—Oliff & Berridge, PLC

(57) ABSTRACT

A three-dimensional shape measuring apparatus capable of simultaneously obtaining range information and luminance information with high precision, independently of an object. A controller scans slit light, emitted from a laser beam source and shaped by a cylindrical lens, on an object plural times, by mirror surfaces of a polygon mirror, while causing the laser beam source to flash by using a laser beam source driver. The slit light is time-sequentially combined into projection pattern light having plural light stripes, respectively 3-level or more intensity-modulated, and the projection pattern light is projected onto the object. An image processor obtains the range information and the luminance information based on reflection light obtained by image pickup by first and second cameras.

10 Claims, 5 Drawing Sheets

THREE-DIMENSIONAL SHAPE MEASURING APPARATUS

BACKGROUND OF THE INVENTION

1. Field of the Invention

The present invention relates to a three-dimensional shape measuring apparatus which obtains range information to an object by using a pattern projection (structured light projection) method, and more particularly, to a three-dimensional shape measuring apparatus which simultaneously obtains range information and luminance information with high precision independently of object.

2. Description of the Prior Art

As methods for measuring the shape of an object, conventionally a passive method (a stereoscopic vision method etc.) and an active method (structured light projection spot light projection etc. using laser radar) have been known. The passive method has general versatility and can ease constraints on an object. The active method attains a high level of measurement precision although the range of measurement is often small due to limitation of light projection unit or the like.

In one of active methods, a pattern projection method, pattern light as a reference is projected onto an object, and image pickup is performed from a direction different from a direction of the pattern light projection. The obtained pattern is deformed by the shape of the object. Three-dimensional measurement of the object can be made by correlating the deformed pattern obtained by image pickup with the projected pattern.

In the pattern projection method, the problem is how to perform the correlating between the deformed pattern and the projected pattern with a small amount of erroneous correlation and in a simple manner. Conventionally, various pattern projection methods have been proposed.

For example, Japanese Published Unexamined Patent Application No. Hei 5-332737 and Japanese Patent No. 2565885 disclose the conventional pattern projection methods.

Japanese Published Unexamined Patent Application No. Hei 5-332737 discloses a shape measuring apparatus using a spatial coding method as a pattern projection method. This apparatus has a laser beam source, a lens system to shape laser beam into slit light, a scanning device to emit the shaped laser beam onto an object and scans the light on the object, a CCD camera to detect reflection light from the object, and a device to control these elements. In this construction, when the object is scanned with the laser beam by the scanning device, portions irradiated with the laser beam and unirradiated portions form a stripe pattern. The object surface is divided into N recognizable portions by plural different patterns of laser beam emission. The shape of the object is calculated by determining a portion including each pixel in images of the object obtained by image pickup by the CCD camera from different positions.

Japanese Patent No. 2565885 discloses a shape measuring apparatus using a spatial coding method as a pattern projection method. This apparatus has a ternary grating plate pattern original image where at least three types of gradation areas are adjacent to each other at an intersection of boundaries of the gradation areas, a projector to project ternary grating plate pattern light via the pattern original image onto an object, a CCD camera to image-pickup the object on which the ternary grating plate pattern light is projected, and a measuring unit to correlate the pattern original image with the pattern image obtained by image pickup by the CCD camera, thus performing measurement. In this construction, when the projector projects the ternary grating plate pattern light onto the object, and the CCD camera performs image pickup on the object where the grid-plate pattern light is projected, a pattern image is obtained. The measuring unit assigns a main code to each intersection of gradation areas of the pattern image, in correspondence with the types and orders of peripheral gradations, and assigns an adjacent main code as a feature code for recognition of the intersection. This uniquely correlates the pattern obtained by image pickup and the pattern original image, accordingly, high density measurement can be performed by one projection.

However, according to the conventional shape measuring apparatus disclosed in Japanese Published Unexamined Patent Application No. Hei 5-332737, in order to increase the resolution, several times of scanning with the laser beam and several times of image pickup by the camera are required. For example, to divide an image into 256 areas, eight times of image pickup are necessary. For this reason, image pickup cannot be performed on a quickly moving object without difficulty.

According to the conventional shape measuring apparatus disclosed in Japanese Patent No. 2565885, since the focal depth of optical system of the projector is small, the edge between tonality areas become blurred in correspondence with the distance to the object surface and measurement cannot be made with high precision. Thus the measurement-possible range in a depthwise direction is limited.

Further, in the respective conventional shape measuring apparatuses, as a projected pattern changes in accordance with the shape, the reflectivity and the like of the object, correlating between the pattern and the projected pattern is difficult.

SUMMARY OF THE INVENTION

The present invention has been made in view of the above circumstances, and provides a three-dimensional shape measuring apparatus capable of obtaining range information with high precision independently of an object.

Further, the present invention provides a three-dimensional shape measuring apparatus capable of simultaneously obtaining luminance information and range information.

According to one aspect of the present invention, provided is a three-dimensional shape measuring apparatus including: a light source that emits laser beam; a projection part that generates pattern light having plural areas, intensity-modulated to ternary or higher representation values based on a pattern code, using the laser beam, and projects the pattern light onto an object; an image pickup part that performs image pickup on the light, reflected from the object by projection of the pattern light, so as to obtain a pattern image; and an arithmetic part that calculates range information to the object based on the pattern code and the pattern image.

In accordance with the above construction, the laser beam used as a light source has a linearity which is not greatly influenced by a focal depth or the like, the edge between areas is not blurred and the measurement possible range in the depthwise direction can be widened. Further, by projecting the intensity-modulated pattern light onto an object, the shape can be measured by one image pickup.

According to another aspect of the present invention, provided is a three-dimensional shape measuring apparatus including: a light source that emits laser beam; a projection part that generates pattern light having plural areas, intensity-modulated to ternary or higher representation values based on a pattern code, using the laser beam, and projects the pattern light onto an object; an image pickup part that performs image pickup on the light, reflected from the object by projection of the pattern light, so as to obtain a pattern image; an arithmetic part that calculates range information to the object based on the pattern code and the pattern image; and a three-dimensional image formation part that forms a three-dimensional image based on the range information obtained by calculation by the arithmetic part and luminance information obtained by the image pickup part.

In accordance with the above construction, as the laser beam is used as a light source, the edge between areas is not blurred and the measurement-possible range in the depthwise direction can be widened. Further, by projecting the intensity-modulated pattern light onto an object, the shape can be measured by one image pickup. The three-dimensional image formation part forms a three-dimensional image based on the range information and the luminance information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
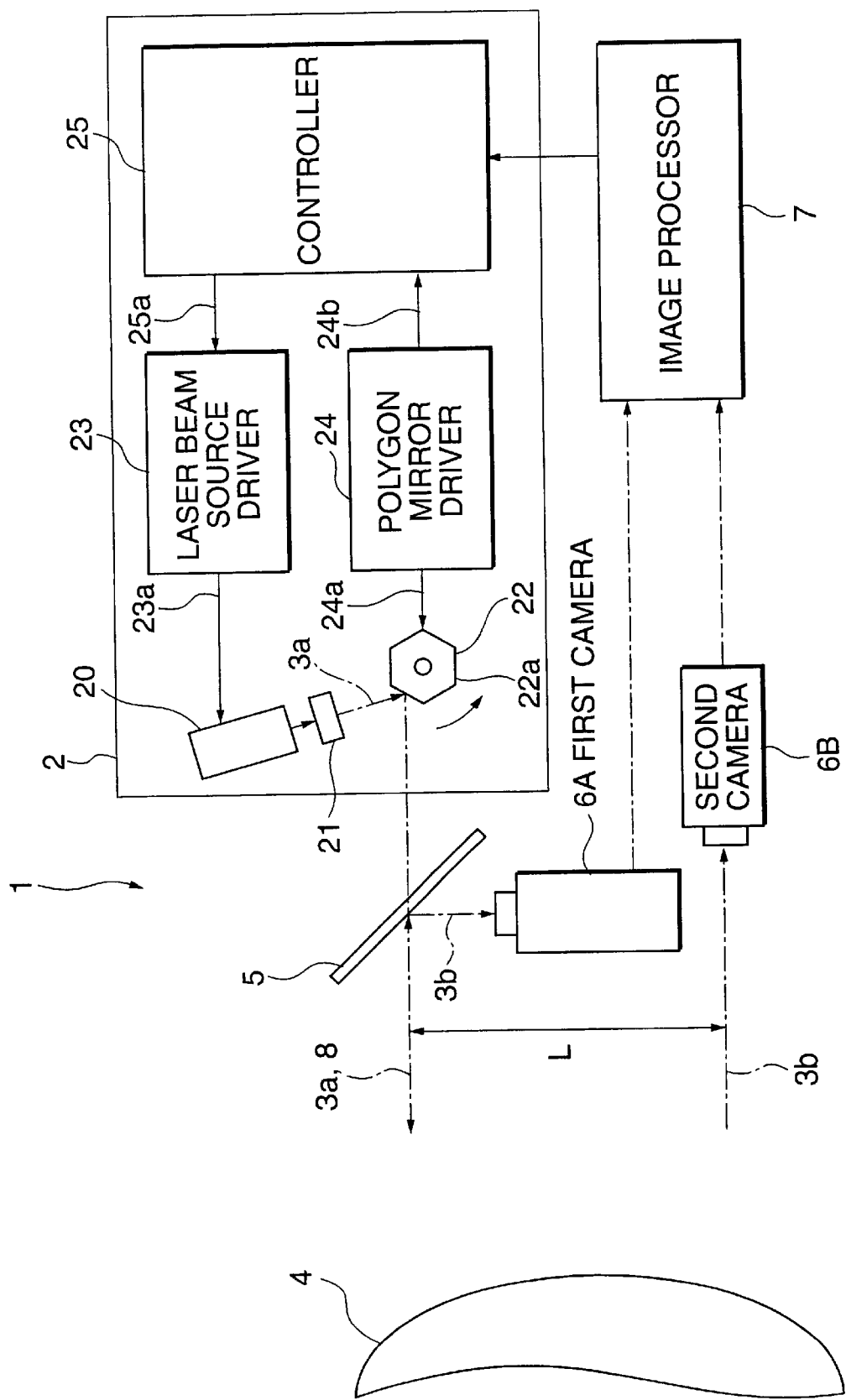
FIG. 1 is a block diagram showing the construction of a three-dimensional image pickup apparatus according to an embodiment of the present invention.

FIG. 1 shows a three-dimensional image pickup apparatus to which a three-dimensional shape measuring apparatus according to an embodiment of the present invention is applied. The three-dimensional image pickup apparatus 1 has a projector 2 which projects projection pattern light 8, intensity-modulated to 3 values or more, onto an object 4, a first camera 6A which performs image pickup via a half mirror 5 on reflection light 3b, from projection pattern light 8 and extraneous light reflected by the object 4, a second camera 6B, placed away from the light axis of the projector 2 by a predetermined distance L, which performs image pickup on the reflection light 3b from the object 4, and an image processor 7 which forms a three-dimensional image of range information and luminance information based on images obtained by the first and second cameras 6A and 6B.

The projector 2 has a laser beam source 20 which emits laser beam having a single light intensity in an invisible region of ultraviolet or infrared light, a cylindrical lens 21 which shapes the laser beam emitted from the laser beam source 20 into slit light 3a, a polygon mirror 22 having plural (e.g., 12) mirror surfaces 22a, which deflect-scans the slit light 3a shaped by the cylindrical lens 21 by the mirror surfaces 22a, a laser beam source driver 23 which outputs a laser drive signal 23a to the laser beam source 20 to drive the laser beam source 20, a polygon mirror driver 24 which outputs a mirror drive signal 24a to the polygon mirror 22 to rotate the polygon mirror 22 in a predetermined direction, and outputs a mirror angle signal 24b corresponding to the angle of the polygon mirror 22, and a controller 25 which outputs an on/off synchronizing signal 25a to the laser beam source driver 23 based on the mirror angle signal 24b from the polygon mirror driver 24.

Figure 2A:
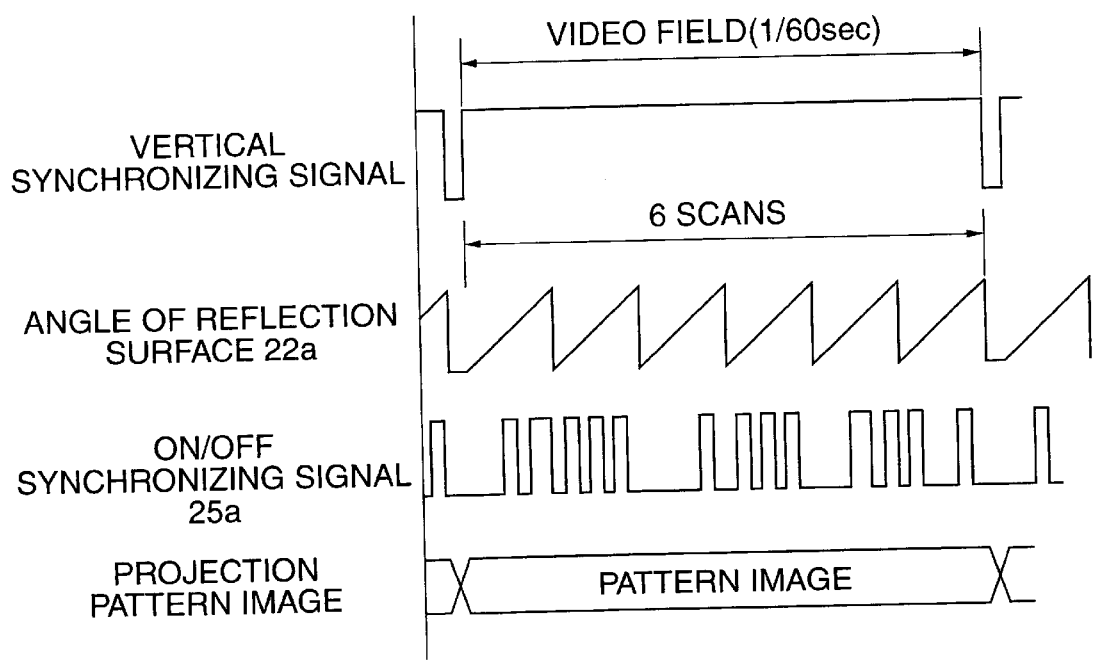
FIG. 2A is a timing chart showing a projection pattern light formation operation according to the embodiment.
Figure 2B:
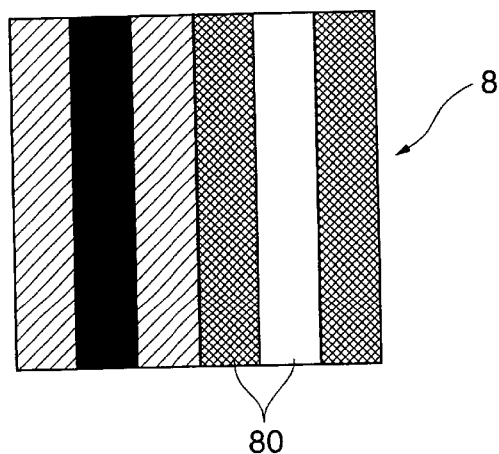
FIG. 2B is an example of the projection pattern light.

FIG. 2A shows an operation of forming the projection pattern light 8. As shown in FIG. 2A, the controller 25 of the projector 2 outputs the on/off synchronizing signal 25a to the laser beam source driver 23 based on a pattern code stored in advance in a frame memory in the image processor 7 and the mirror angle signal 24b from the polygon mirror driver 24, and causes the laser beam source 20 to flash by the laser beam source driver 23, so as to scan the slit light 3a, emitted from the laser beam source 20 and shaped by the cylindrical lens 21, on the object 4, by the mirror surfaces 22a of the polygon mirror 22. Then, the controller 25 repeats the operation plural times (six times in FIG. 2A) during a half rotation of the polygon mirror 22, i.e., in one video frame period of the first and second cameras 6A and 6B, thus time-sequentially combining the slit light 3a, into the projection pattern light 8 including plural stripe lights 80 having different light intensities as shown in FIG. 2B.

Figure 3:
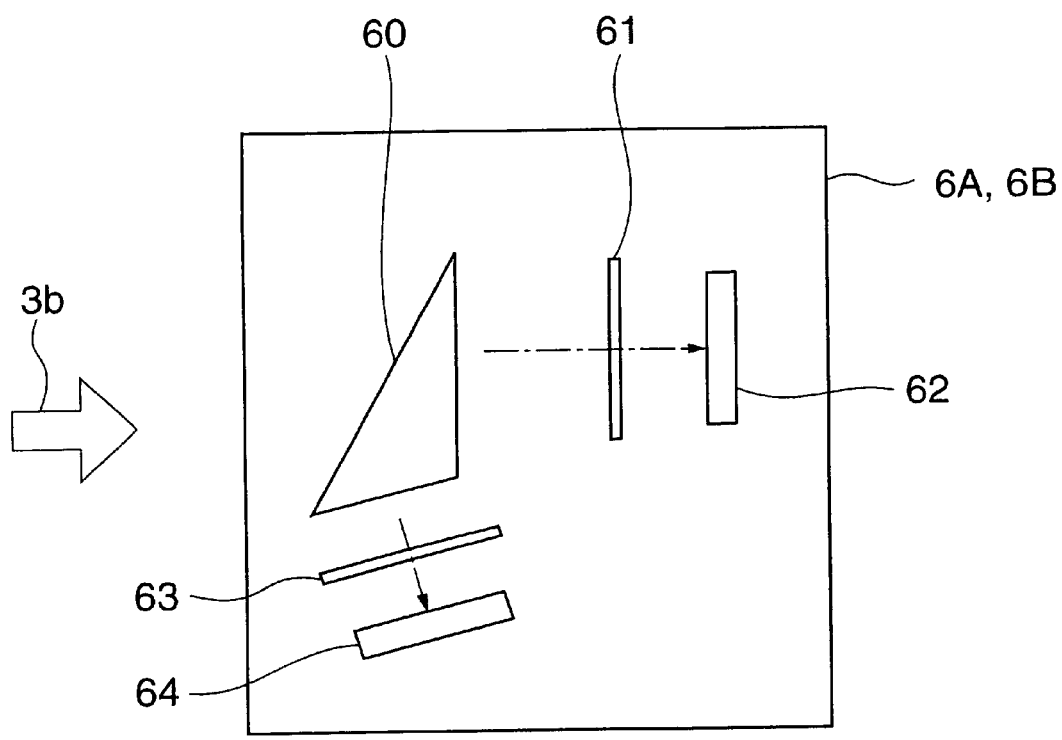
FIG. 3 is a schematic diagram showing the structure of first and second cameras according to the embodiment.

FIG. 3 shows the first and second cameras 6A and 6B. The first and second cameras 6A and 6B respectively have a prism 60 which divides the reflection light 3b from the object 4 in two directions, an invisible region block filter 61 which cuts components in an invisible region of the reflection light 3b divided by the prism 60 in one direction, a color CCD camera 62 which performs image pickup on the reflection light 3b passed through the invisible region block filter 61 to obtain a luminance image, an invisible region pass filter 63 which passes the components in the invisible region of the reflection light 3b divided by the prism 60 in the other direction, and a color CCD camera 64 which performs image pickup on the reflection light 3b passed through the invisible region pass filter 63 to obtain a pattern image.

Figure 4:
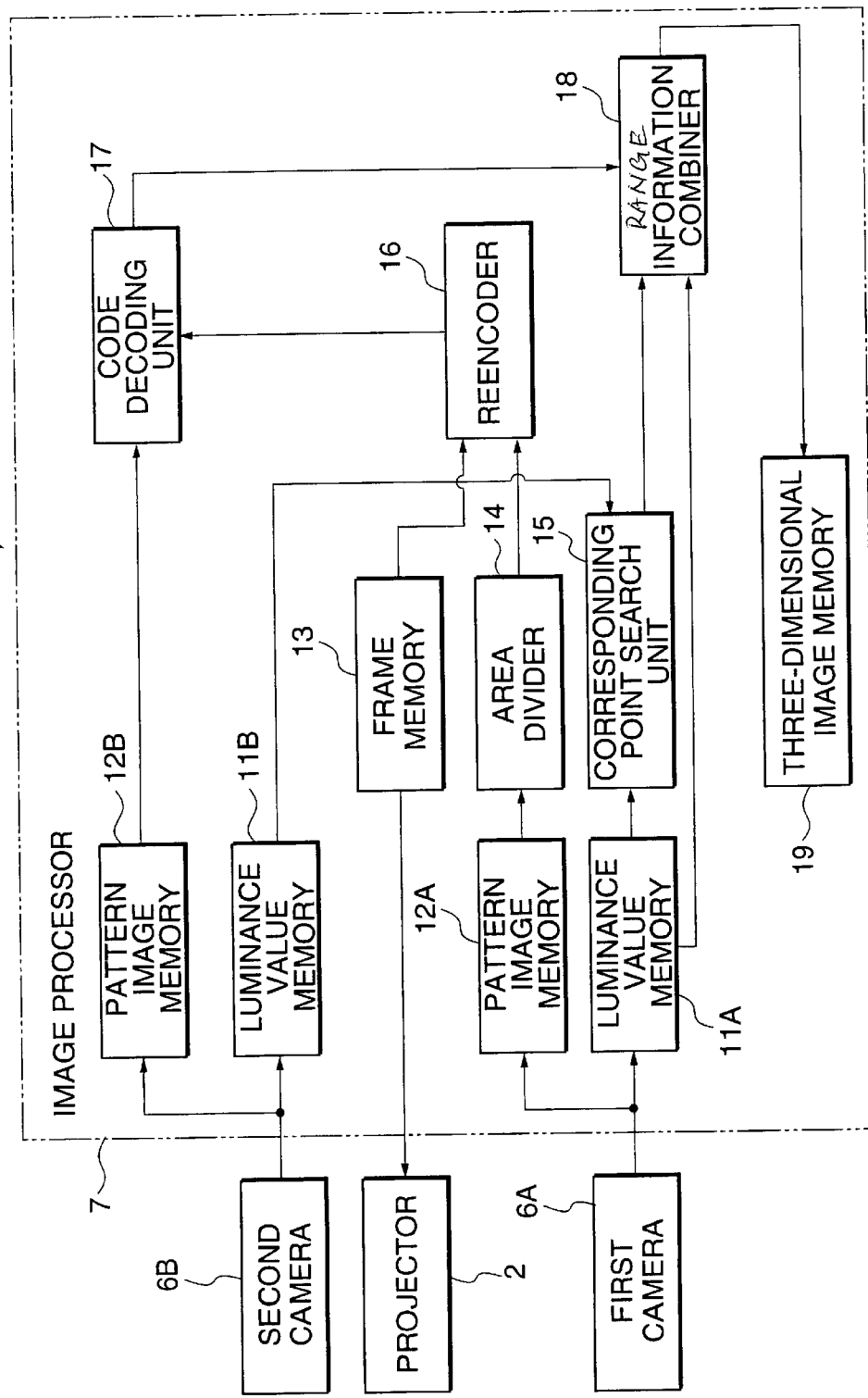
FIG. 4 is a block diagram showing a control system of the three-dimensional image pickup apparatus according to the embodiment.

FIG. 4 shows a control system of the three-dimensional image pickup apparatus. The apparatus 1 has a luminance value memory 11A in which the luminance image obtained by the first camera 6A is stored, a pattern image memory 12A in which the pattern image obtained by the first camera 6A is stored, a luminance value memory 11B in which the luminance image obtained by the second camera 6B is stored, a pattern image memory 12B in which the pattern image obtained by the second camera 6B is stored, a frame memory 13 in which pattern codes for square grid cells divided from a stripe pattern corresponding to the projection pattern light 8 projected by the projector 2 are stored, an area divider 14 which divides the area of the pattern image obtained by the first camera 6A, a corresponding point search unit 15 which searches the luminance value memories 11A and 11B for luminance information corresponding to the areas divided by the area divider 14 and reads the information, a reencoder 16 which reencodes a predetermined area divided by the area divider 14, by using the pattern image stored in the pattern image memory 12A and the pattern code stored in the frame memory 13, a code decoding unit 17 which calculates range information on the distance to the object 4 from the pattern code reencoded by the reencoder 16 and the pattern image obtained by the second camera 6B, a range information combiner 18 which combines the luminance information read by the corresponding point search unit 15 from the luminance value memories 11A and 11B with the range information obtained by the code decoding unit 17, thus forms a three-dimensional image, and a three-dimensional image memory 19 in which the three-dimensional image formed by the range information combiner 18 is stored.

Next, the operation of the apparatus will be described. First, the controller 25 of the projector 2 outputs the on/off synchronizing signal 25a to the laser beam source driver 23 based on the pattern code stored in advance in the frame memory 13 and the mirror angle signal 24b from the polygon mirror driver 24, as shown in FIG. 2A. The laser beam source driver 23 outputs the laser drive signal 23a to the laser beam source 20 in synchronization with the on/off synchronizing signal 25a from the controller 25. The laser beam source 20 emits laser beam pulses having a constant light intensity in an invisible region. The laser beam emitted from the laser beam source 20 is shaped by the cylindrical lens 21 into the slit light 3a, and is reflected by the mirror surface 22a of the polygon mirror 22 and emitted via the half mirror 5 onto the object 4. The controller 25 repeats the operation during a half rotation of the polygon mirror 22, i.e., in one video frame of the CCD cameras 62 and 64. The slit light 3a is time-sequentially combined into the intensity-modulated projection pattern light 8 as shown in FIG. 2B, and is projected onto the object 4.

The first camera 6A performs image pickup to obtain an image of the object 4 on which the projection pattern light 8 is projected via the half mirror 5. That is, the color CCD camera 62 of the first camera 6A stores the obtained image of the object 4 as a luminance image into the luminance value memory 11A, and the color CCD camera 64 of the first camera 6A stores the obtained image of the object 4 as a pattern image into the pattern image memory 12A. The second camera 6B performs image pickup to obtain an image of the object 4 from an angle different from that of the image pickup by the first camera 6A. That is, the color CCD camera 62 of the second camera 6B stores the obtained image of the object 4 as a luminance image into the luminance value memory 11B, and the color CCD camera 64 of the second camera 6B stores the obtained image of the object 4 as a pattern image into the pattern image memory 12B.

The area divider 14 divides the area of the pattern image obtained by the first camera 6A and stored in the pattern image memory 12A. That is, the area divider 14 extracts a stripe pattern from the pattern image, then divides an area having an intensity difference between adjacent stripes less than a threshold value as an area 1 which the slit light 3a from the projector 2 has not reached, and divides an area having an intensity difference between stripes equal to or greater than the threshold value as an area 2.

The corresponding point search unit 15 reads luminance information corresponding to the areas 1 and 2 divided by the area divider 14 from the luminance value memories 11A and 11B, and outputs the information to the range information combiner 18.

The reencoder 16 reencodes the area 2 divided by the area divider 14 by using the pattern image stored in the pattern image memory 12A and the pattern code stored in the frame memory 13. That is, the reencoder 16 extracts a stripe pattern from the pattern image, and divides the respective stripes in a vertical direction, thus generating square cells. The reencoder 16 obtains an average intensity value in each cell as the intensity of the cell. Then the reencoder 16 compares the pattern code in the frame memory 13 with the intensities between cells corresponding to the stripe pattern extracted from the pattern image obtained by the first camera 6A, sequentially from the center of the image, so as to determine whether or not the intensity difference between cells is equal to or grater than a threshold value by change in stripe luminance due to the reflectivity of the object 4, the distance to the object 4 and the like. If the difference is not equal to or greater than the threshold value, the reencoder 16 terminates reencoding on all the obtained cells. If the difference is equal to or greater than the threshold value, the reencoder determines whether or not the cell has a newly different intensity. If the cell has a newly different intensity, the reencoder 16 generates a new code, and allots the code to the cell. Further, if the cell does not have a newly different intensity, the reencoder 16 encodes the cell by using an array of stripes distinguishable from other existing portions. Thus the reencoder 16 completes the reencoding.

Figure 5A:
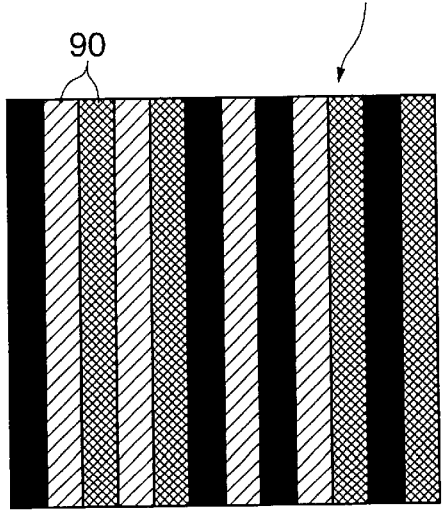
FIGS. 5A to 5C are examples of coded slit pattern by a reencoder according to the embodiment.
Figure 5B:
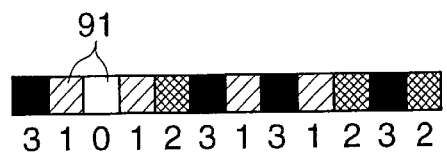
Figure 5C:
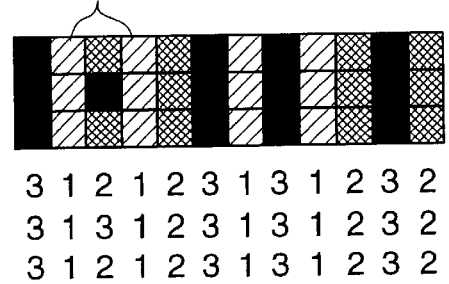

FIGS. 5A to 5C show examples of stripe pattern codes. FIG. 5A shows a stripe pattern 9 coded in accordance with the array of stripes 90. In the stripe pattern 9, any one of intensities 3 (high), 2 (intermediate), and 1 (low) are allotted to each stripe 90. In FIG. 5B, as a new code has appeared due to intensity change in a cell 91 which is the third cell from the left end, a code "O" is newly allotted to the cell 91. In FIG. 5C, as an existing code has appeared in the cell 91 which is the third from the left end and the second from the top, reencoding is made with a vertical array "232" and a horizontal array "131" as new codes from the array of the cell 91. The reencoding equals projecting a complicated pattern such as a two-dimensional pattern onto a portion where the change amount of object shape is large, while projecting a simple pattern onto a portion where the change amount is small. The reencoder repeats this process, allotting respectively unique codes to all the cells 91, thus performing reencoding.

Figure 6:
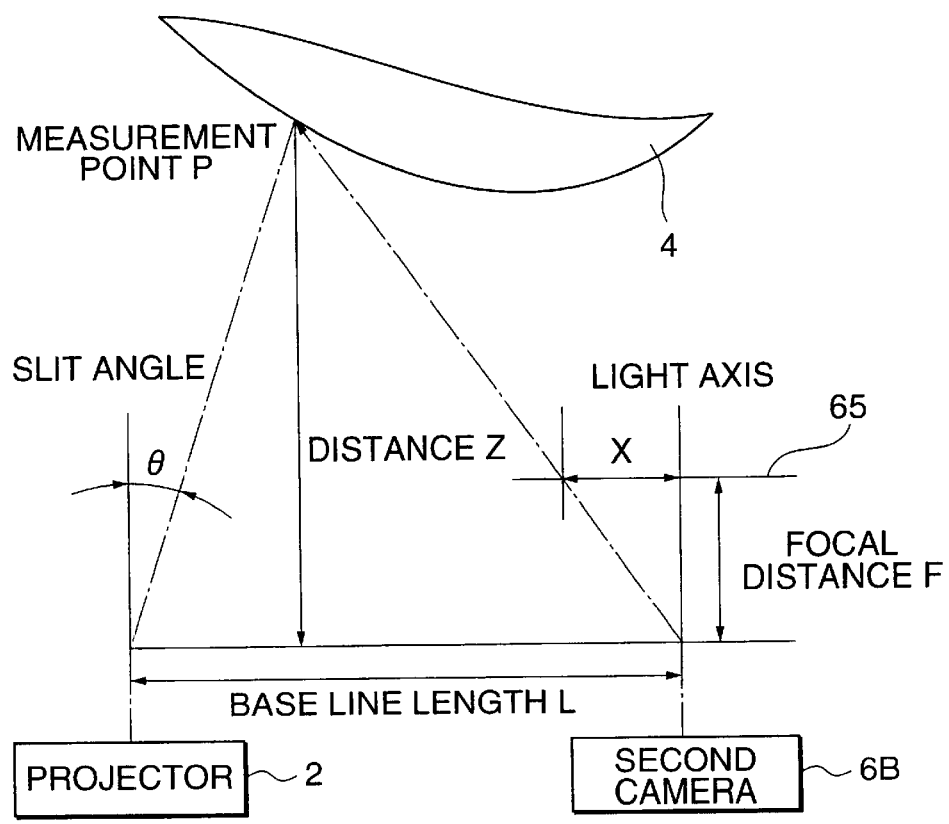
FIG. 6 is an explanatory view showing a method of distance calculation using spatial coding by a decoder according to the embodiment.

FIG. 6 shows a method of distance calculation by the code decoding unit 17. The code decoding unit 17 extracts a stripe pattern from the pattern image stored in the pattern image memory 12B, divides the respective stripes into cells, detects the code of each cell by using the codes reencoded by the reencoder 16, and calculates a slit angle ? from the projector 2 based on the detected code. The code decoding unit 17 calculates a distance Z by the following expression (1) from the slit angle ? of the cell 91 to which each pixel belongs, an x coordinate of the image obtained on an image focusing surface 64 of the second camera 6B, a focal distance F and a base line length (distance) L as camera parameters.

$$Z = (F \times L)/(x + F \times \tan\theta) \qquad (1)$$

Further, regarding the area 1, the distance is calculated as follows. In the area 1, as pattern detection by the projection pattern light 8 cannot be performed, the corresponding point search unit 15 detects a parallax by using the luminance information read from the luminance value memories 11A and 11B, and calculates the distance based on the information. In the area 2 except the area 1, as the distance is calculated by the above operation, a minimum value of the distance in the area 1 can be obtained, and pixels which can be correlated to each other can be defined. These defining factors are used in correlating between pixels to detect a parallax d, then a distance Z is calculated by the following expression (2) using a pixel size ? as a camera parameter.

$$Z=(L \times F)/(? \times d) \qquad (2)$$

The range information combiner 18 forms a three-dimensional image by combining the range information calculated by the code decoding unit 17 with the luminance information in the first luminance value memory 11A and the second luminance value memory 11B, and stores the three-dimensional image into the three-dimensional image memory 19.

According to the apparatus 1 of the embodiment, the following advantages are obtained.

(1) As the laser beam has a linearity which is not greatly influenced by focal depth or the like, the edge between stripes is not blurred, and the measurement-possible range in a depthwise direction can be widened.

(2) As the intensity-modulated projection pattern light 8 is projected onto the object 4, the three-dimensional shape of the object can be measured in one image pickup, and image pickup can be performed even on a quickly-moving object.

(3) The influence such as reflectivity of the object 4 can be removed by reencoding using the pattern obtained with the same light axis as that of projection of the projection pattern light 8, and three-dimensional shape measurement can be performed with high precision independently of object.

(4) As the probability that some stripe changes to the same stripe of that of another portion due to the reflectivity, shape and the like of the object 4 is reduced, erroneous correlating between the pattern image obtained by image pickup and the projection pattern image is reduced, and the amount of calculation for reencoding can be reduced.

(5) As the reflection light from the object is divided into light of components in the invisible region and components in the visible region and respectively subjected to image pickup, the range information and the luminance information can be simultaneously obtained.

Note that in the embodiment, infrared or ultraviolet laser beam is used as a light source, however, a wavelength in another invisible region may be used.

Further, a third camera to image-pickup the reflection light 3b from the object 4 may be provided. This can remove occlusion which is a problem in pattern projection methods.

Further, a surface light-emission type laser may be used as a light source. In this case, laser beam emitted from the surface light-emission type laser is passed through a shading filter such as a spatial modulator, then the laser beam as an intensity-modulated project pattern is projected onto the object. Further, the projection pattern may be formed by rotating the laser beam source and the cylindrical lens by a piezoelectric device. In this case, a mechanical part such as the polygon mirror can be omitted, and a long life can be attained.

As described above, according to the three-dimensional shape measuring apparatus of the present invention, as the laser beam used as a light source has linearity which is not greatly influenced by focal depth or the like, the edge between areas is not blurred, and measurement-possible range in a depthwise direction can be widened. Further, as the intensity-modulated pattern light is projected onto the object, the shape can be measured in one image pickup. As a result, the range information can be obtained with high precision independently of object.

Further, as the range information combiner 18 forms a three-dimensional image based on the range information and the luminance information, the luminance information and the range information can be simultaneously obtained.

As many apparently widely different embodiments of the present invention can be made without departing from the spirit and scope thereof, it is to be understood that the invention is not limited to the specific embodiments thereof except as defined in the appended claims.

What is claimed is:

1. A three-dimensional shape measuring apparatus comprising:

a light source that emits a laser beam;

a projection part that generates pattern light having plural areas, intensity-modulated to ternary or higher representation values based on a pattern code, using the laser beam, and projects the pattern light onto an object;

an image pickup part that performs image pickup on the light reflected from the object by projection of the pattern light to simultaneously obtain a pattern image and a luminance image; and an arithmetic part that calculates range information about a distance to the object based on the pattern code and the pattern image.

2. The three-dimensional shape measuring apparatus according to claim 1, wherein the projection part comprises:

a shaping part that shapes the laser beam emitted from the light source into slit light;

a deflection part that deflects the slit light to scan the object; and a control part that controls the light source and the deflection part based on the pattern code to generate the pattern light using the slit light.

3. The three-dimensional shape measuring apparatus according to claim 2, wherein the deflection part is a polygon mirror.

4. The three-dimensional shape measuring apparatus according to claim 2, wherein the control part controls the deflection part to scan the object with the slit light several times, and generates the pattern light by causing the laser beam to flash in accordance with the number of scans of the slit light and scan positions.

5. The three-dimensional shape measuring apparatus according to claim 1, wherein the image pickup part comprises:

a first image pickup part that performs image pickup on the light from the object in a projection direction of the projection part to obtain a first pattern image; and a second image pickup part that performs image pickup on the light from the object in a projection direction different from that of the projection part to obtain a second pattern image, wherein the arithmetic part modifies the pattern code based on the first pattern image, and calculates range information about a distance to the object based on the modified pattern code and the second pattern image.

6. A three-dimensional shape measuring apparatus comprising:
- a light source that emits a laser beam;
- a projection part that generates pattern light having plural areas, intensity-modulated to ternary or higher representation values based on a pattern code, using the laser beam, and projects the pattern light onto an object;
- an image pickup part that performs image pickup on the light, reflected from the object by projection of the pattern light to simultaneously obtain a pattern image and a luminance image;
- an arithmetic part that calculates range information about a distance to the object based on the pattern code and the pattern image; and
- a three-dimensional image formation part that forms a three-dimensional image based on the range information obtained by calculation by the arithmetic part and luminance information obtained by the image pickup part.

7. A three-dimensional shape measuring apparatus comprising:
- a light source that emits a laser beam;
- a projection part that generates pattern light having plural areas, intensity-modulated to ternary or higher representation values based on a pattern code, using the laser beam, and projects the pattern light onto an object;
- a camera having a first and second image pickup part, and the camera receiving reflected light from the object and dividing the reflected light to the first and second image pickup part so that the first and second image pickup part obtains respectively a first and second pattern image; and
- an arithmetic part that modifies the pattern code based on the first pattern image, and calculates range information about a distance to the object based on the modified pattern code and the second pattern image.

8. The three-dimensional shape measuring apparatus according to claim 7, wherein the projection part comprises:
- a shaping part that shapes the laser beam emitted from the light source into slit light;
- a deflection part that deflects the slit light to scan the object; and
- a control part that controls the light source and the deflection part based on the pattern code to generate the pattern light using the slit light.

9. The three-dimensional shape measuring apparatus according to claim 8, wherein the deflection part is a polygon mirror.

10. The three-dimensional shape measuring apparatus according to claim 8, wherein the control part controls the deflection part to scan the object with the slit light several times, and generates the pattern light by causing the laser beam to flash in accordance with the number of scans of the slit light and scan positions.

* * * * *